J. A. CHARTER.
PISTON RING.
APPLICATION FILED DEC. 11, 1916.
1,250,431.
Patented Dec. 18, 1917.
2 SHEETS—SHEET 1.
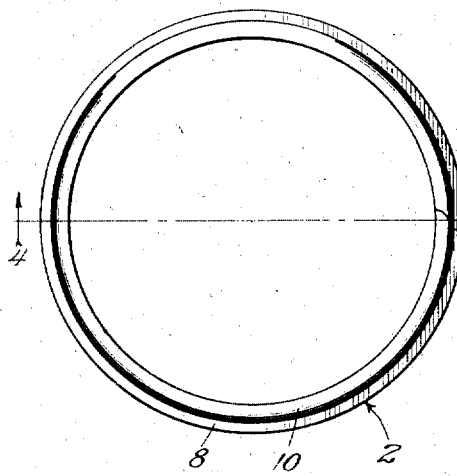
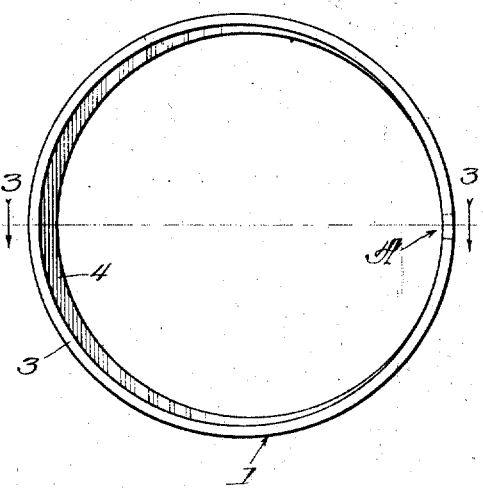
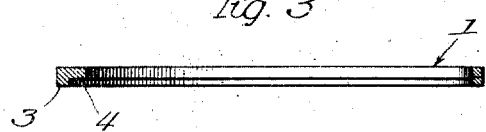
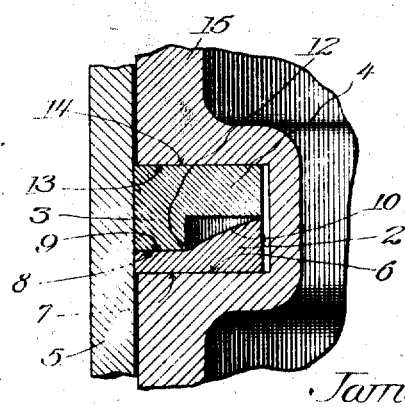
Witnesses:
Robert H. Weir
Arthur W. Carlson
Inventor
James A. Charter
By Cheever & Cox
Attys.

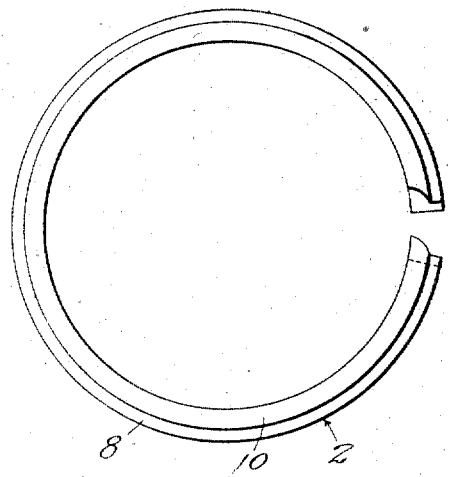
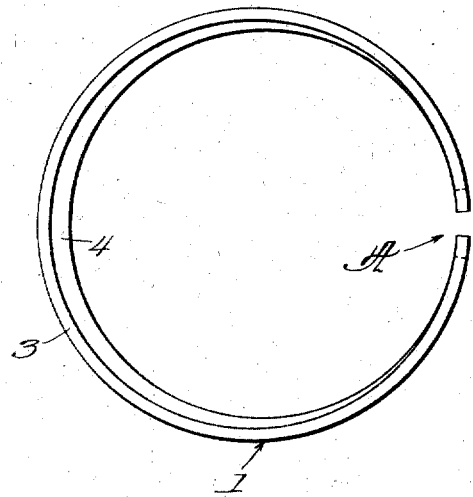
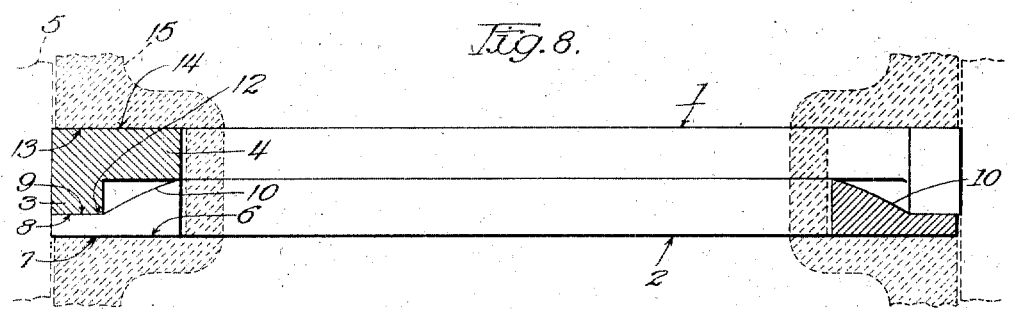
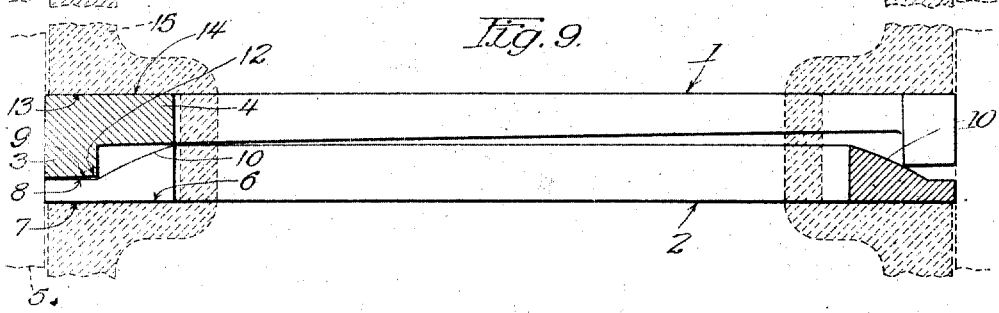

UNITED STATES PATENT OFFICE.

JAMES A. CHARTER, OF CHICAGO, ILLINOIS.

PISTON-RING.

1,250,431.  Specification of Letters Patent.  Patented Dec. 18, 1917.

Application filed December 11, 1916. Serial No. 136,135.

*To all whom it may concern:*

Be it known that I, JAMES A. CHARTER, a citizen of the United States, residing at Chicago, in the county of Cook and State of Illinois, have invented a certain new and useful Improvement in Piston-Rings, of which the following is a specification.

My invention relates to piston rings for use in internal combustion engines and elsewhere. It will be understood by those familiar with the art that it is necessary to compensate not only for the wear on the circumferential surface on the ring but also for the wear on the sides of the ring and the proximate or contacting sides of the groove in the piston. It is common to compensate for the wear on the circumferential surface of the ring by splitting it. Various methods have been employed for compensating for side wear. One of these methods is to construct the ring in two or more mating parts each of which is split and expansible, one part operating to wedge the other part or parts as wear occurs, and thus keep a tight fit both at the periphery of the ring and at the two sides thereof where contact is made with the sides of the groove of the piston. Rings of this character may be termed "compound rings," as distinguished from single split rings which are also commonly known in the art. But one of the disadvantages of the compound rings heretofore known is that they produce different amounts of wear at different points of the circumference. Experience has taught that when the ring is concentric in internal and external diameter the radial pressure, and hence the wear on the cylinder, is greater near the ends, where the rings are split, than at the points farther remote from said ends. One of the objects of my invention is to produce a compound ring which will combine the characteristics of producing a uniform radial pressure at all points of the circumference and at the same time keep the parts gas tight not only at the surface where the ring rubs upon the cylinder but also at the surfaces where the ring contacts the two sides of the groove in the piston.

I accomplish my object by the construction illustrated in the accompanying drawings, in which:

Figure 1 is a face view of the master ring in assembled position.

Fig. 2 is a corresponding face view of the secondary ring.

Fig. 3 is a section of the master ring on the line 3—3, Fig. 1.

Fig. 4 is a section of the secondary ring on the line 4—4, Fig. 2.

Fig. 5 is a fragmentary detail showing the two rings and associated portions of the piston and cylinder in assembled position, the thickest section of the master ring showing.

Figs. 6 and 7 show respectively the master and secondary rings when removed from the piston.

Fig. 8 is a central section through the piston and rings showing the rings in position when first assembled before any wear has taken place.

Fig. 9 shows the same parts in working position after considerable wear on the master ring has taken place, and the secondary ring has expanded (with some wear) to compensate for this.

Similar numerals refer to similar parts throughout the several views.

The master ring is identified in general by reference numeral 1 and the secondary ring in general by the reference numeral 2. The master ring is split at the points A in the usual manner and is thus expansible, being made of metal more or less resilient. This ring when viewed from the side, as in Figs. 1 and 7, is eccentrically bored, being thinnest at the ends and thickest at the points midway between the ends. At the side which lies nearest to the secondary ring, when the parts are assembled, the master ring is so configurated, preferably by machining, as to leave a concentric outer portion 3. In consequence, that portion of the ring farthest from the split ends is L-shaped in cross-section, as clearly shows in Fig. 5, the width of the ledge 4 thinning in proportion as it reaches the split ends. One of the results of this configuration is that, as is well understood by engineers, the ring has the advantage that the radially outward pressure of the master ring upon the engine cylinder 5 is approximately uniform at all points of the outer circumference of the ring due to its tapering section or eccentricity.

The secondary ring 2 constitutes the means for compensating for the naturally occuring side wear. This secondary ring has the same cross section at all points and its side surface 6 contacts the side surface 7 of the groove of the piston in the usual manner. The surface 8 of the ring 2, which is parallel to surface 6, forms a meeting face to coöperate with the meeting face 9 of the master ring 1. The surface 8, however, is but little, if any, wider than the concentric portion 3 of the master ring, and from this point is configurated to a curve 10, which rises from the inner diameter of the meeting face 8. The curved surface 10 of the secondary ring conforms approximately to the surface of a sphere, a portion of whose surface is indicated by the broken line 11 of Fig. 4. The result of this construction is that the secondary ring forms a portion, as it were, of the ball of a ball and socket joint, the analogue of the socket being represented by the annular shoulder or corner 12 of the master ring. This quasi ball and socket joint has the effect of compensating for the uneven wear of the master ring sidewise—that is, in an axial direction—in the groove, as is shown in Fig. 9.

Operation: The master ring, which in the preferred construction contains considerably more metal than the secondary ring, exerts an approximately uniform outward pressure at all points of its circumference due to the fact that it is constructed with the cross-sectional area greatest at the points farthest from the split ends, the section tapering off in proportion as it approaches the ends. Being resilient, it is, in a sense, a spring, and operates according to the law of springs, which, when properly designed are thickest at their middle points. Consequently, the same amount of wear is obtained at all points of the circumference and the cylinder is not subject to greater wear at one point of its circumference than at another. This is an important and an obvious advantage. But as the master ring has less side surface to present to the side of the piston groove at its split ends than it has at the point midway between, it will suffer more from sidewise wear at the ends than at the point midway between. In other words, the constant pounding in an axial direction due to the constant reversal of motion of the piston will wear those side surfaces of the master ring faster near the split ends of the master ring than at the intermediate point. This causes uneven wear upon the sides of the master ring. This uneven wear tends to shift the plane of the ring as a whole relatively to the axis of the cylinder, as clearly appears in Fig. 9. The ring becoming thinner, axially, near its split ends would become loose and cause a pounding at each reversal of movement of the piston were it not for the peculiar shape of the secondary ring which compensates for the uneven wear in the manner clearly shown in Fig. 9, and as follows: At the point where the master ring is thinnest, axially; i. e., at A (Fig. 1), there is less wearing surface, axially, between the meeting surfaces 8 and 9 of the two rings, hence there is, as wear takes place, greater space for expansion, and the secondary ring has, therefore, on this side, greater space for shifting sidewise and consequently for gradual expansion of the whole ring as its own wear takes place. Such expansion relatively to the master ring is possible on account of the fact that the secondary ring presents a much smaller surface to the cylinder wall, and hence wears more rapidly than the master ring, which possesses much more metal at its peripheral surface, due to its width of face, but the expansion of the secondary ring at the point where the master ring is thinnest brings the rapidly rising curve 10 of the secondary ring into engagement with the annular shoulder 12 of the master ring and keeps the side surface 13 of the master ring always snug against the adjacent side surface 14 of the groove in piston. In other words, the secondary ring shifts at this point toward the cylinder and away from the master ring at its thinnest portion, and by moving axially compensates for the excessive side wear of the metal of the master ring on this side of the cylinder. The net result is that with my device, the wear upon the inner surface of the cylinder remains constant at all points of the circumference and yet the uneven wear which results, axially, in the master ring, due to its tapering or eccentric construction, is compensated for by the secondary ring with its approximately spherical surface. This device, therefore, combines two highly desirable characteristics; to-wit: the ability to maintain the wear on the cylinder uniform at all points so that the cylinder will not become out-of-round, and the ability to remain gas tight in all different positions of the two rings by reason of the presence of the quasi spherical surface of the secondary ring, actual tests showing that other forms of surface contact do not produce this result.

Having thus described my invention, what I claim as new and desire to secure by Letters Patent, is:

1. A compound piston ring having a plurality of coöperating parts, one of which is a split master ring and another a split secondary ring, the master ring having an annular shoulder and a varying cross section, thinner near its split ends, and the secondary ring having an approximately spherical surface coöperating with said shoulder whereby uneven wear, axially, of the master ring due to a smaller cross section at one point than another, is compensated for by the expansion of the secondary ring forcing the approximately spherical surface of the secondary ring against the master ring.

2. A compound piston ring composed of two coöperating parts, a split master ring and a split secondary ring, the master ring having a concentric annular shoulder and a ledge eccentric to the outside circumference of the ring, the eccentricity being so arranged as to produce the greatest thickness at the point farthest from the split ends of the ring, the secondary ring having an approximately spherical surface coöperating with said annular shoulder compensating as the secondary ring can expand for unequal wear, axially, in different portions of the master ring.

3. In a device of the class described, the combination of a split master ring and a split secondary ring coöperating therewith, the master ring having a concentric annular shoulder and a ledge eccentric thereto, the eccentricity being so arranged as to produce the greatest thickness at the point farthest from the split ends of the ring, the two rings having coöperating meeting surfaces lying in a plane perpendicular to the axis of the cylinder, and the secondary ring having an approximately spherical surface rising from the inner diameter of the said meeting surface of the secondary ring.

4. As a new article of manufacture, a packing constructed of two rings whose combined outline in cross-section is substantially rectangular and whose meeting faces are disposed at right angles to the axis of the cylinder, each of said rings having separated ends and said separated ends being positioned out of registration with each other, each of said rings being constructed of resilient material, the outer ring having an annular shoulder concentric with the cylinder and an inwardly projecting ledge eccentric thereto for producing uniform pressure against the inside of the cylinder, the inner ring having an approximately spherical surface rising from the inner edge of its meeting face, whereby the unequal wear axially of the outer ring due to the presence of more metal at one point of its circumference than another is compensated for by the spherical surface on the inner ring.

In witness whereof, I have hereunto subscribed my name.

JAMES A. CHARTER.

Witnesses:
M. S. ROSENZWEIG,
ETTA L. WHITE.